United States Patent
Buell et al.

(10) Patent No.: US 7,144,030 B2
(45) Date of Patent: Dec. 5, 2006

(54) PROTECTIVE DEVICE FOR A MOTORCYCLE

(75) Inventors: Erik F. Buell, Mukwonago, WI (US); Michael D. Samarzja, Mukwonago, WI (US); Brain R. Sucharski, Franklin, WI (US); Stephen Fiacchino, Port Washington, WI (US)

(73) Assignee: Buell Motorcycle Company, East Troy, WI (US)

( * ) Notice: Subject to any disclaimer, the term of this patent is extended or adjusted under 35 U.S.C. 154(b) by 202 days.

(21) Appl. No.: 10/886,134

(22) Filed: Jul. 7, 2004

(65) Prior Publication Data

US 2006/0061062 A1 Mar. 23, 2006

(51) Int. Cl.
*B62J 27/00* (2006.01)
(52) U.S. Cl. .................... 280/304.1; 180/219
(58) Field of Classification Search ............ 280/304.3, 280/288.4; 180/219, 220
See application file for complete search history.

(56) References Cited

U.S. PATENT DOCUMENTS

| 629,667 | A | * | 7/1899 | Denbigh ............... 280/304.3 |
| 6,637,787 | B1 | * | 10/2003 | Salvisberg ............... 293/105 |
| 6,837,509 | B1 | * | 1/2005 | Welch et al. ............ 280/304.3 |
| 6,896,278 | B1 | * | 5/2005 | Hepburn ............... 280/304.3 |
| 6,910,704 | B1 | * | 6/2005 | Celiceo et al. ........... 280/304.4 |
| 2004/0251657 | A1 | * | 12/2004 | Kan et al. ................ 280/304.3 |
| 2005/0146114 | A1 | * | 7/2005 | Griffin et al. ............ 280/304.3 |

OTHER PUBLICATIONS

<http://www.kneedraggers.com/details/59-SATO-11> Downloaded from this web address on Dec. 3, 2004. Publicly available prior to Jul. 7, 2003.

* cited by examiner

*Primary Examiner*—Tony Winner
(74) *Attorney, Agent, or Firm*—Michael Best & Friedrich LLP

(57) ABSTRACT

A protective device for a motorcycle. The protective device protects portions of the motorcycle, such as the frame and body panels, from damage due to a tip-over incident or a sliding incident. The protective device of some embodiments includes a shell and a cushion designed to disperse and absorb impact energy. The shell is coupled to the motorcycle with an adhesive. The adhesive has a high shear strength to prevent removal of the shell during a sliding incident.

31 Claims, 4 Drawing Sheets

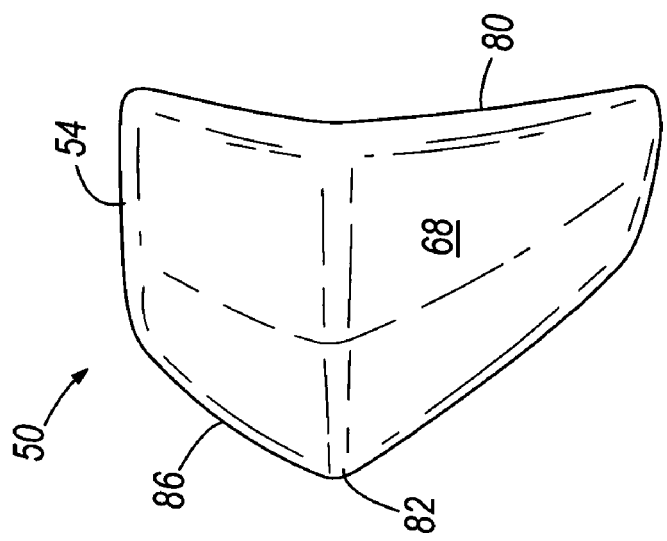
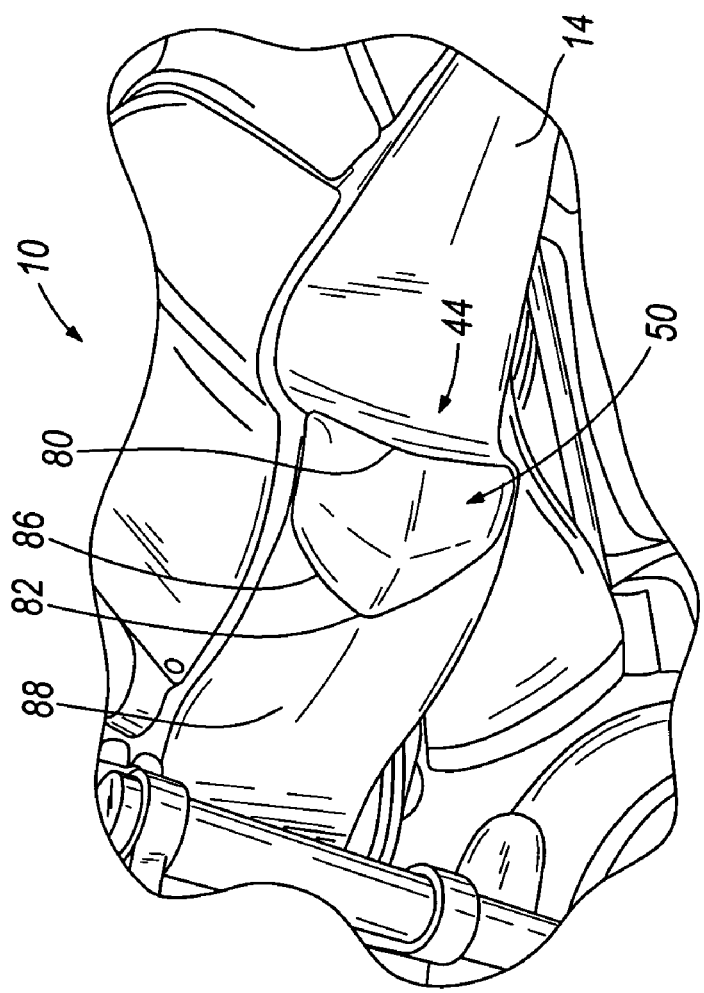

PROTECTIVE DEVICE FOR A MOTORCYCLE

BACKGROUND

Motorcycles can be significantly damaged from stationary tip-over incidents and from sliding incidents. Generally, the portion of the motorcycle (other than the handlebars) that extends the furthest laterally from the centerline of the motorcycle, such as the frame or a fuel tank, will be subjected to the most significant forces during these incidents. As such, these portions of the motorcycle can be significantly damaged. In some situations, the damage can be so severe that these portions of the motorcycle have to be replaced.

Devices known as frame sliders can be mechanically fastened to the motorcycle to protect certain areas from damage during a sliding incident. The frame slider includes a bolt that is mechanically fastened to the motorcycle frame and a replaceable, cylindrically shaped puck that is positioned over a portion of the bolt. The puck can be made from many materials, including plastic and metal.

Since frame sliders are mechanically fastened to the motorcycle frame with a threaded fastener, a lot of preparation work is needed to attach the frame slider to the motorcycle. Typically, an engine mounting bolt or some other bolt is removed and the frame slider bolt is installed in its place. However, on many motorcycles, a fairing or other body panel is positioned over the engine mounting bolt. Thus, a hole needs to be cut into the fairing so the frame slider can extend through the fairing.

SUMMARY OF THE INVENTION

The present invention is directed to a protective device or puck that is coupled to the motorcycle at a probable point of impact with the ground during a sliding impact incident or a stationary tip-over impact incident. The protective device comprises an outer shell coupled to a foam cushion. The protective device can be attached to the motorcycle at the probable point of impact to prevent significant damage to the motorcycle during these types of incidents. An adhesive having high shear strength couples the shell to the motorcycle. During a tip-over incident, the outer shell and foam deform to absorb and disperse the impact force over a greater surface area. During a sliding incident, the outer shell protects the motorcycle from abrasion.

In another embodiment of the present invention, the protective device or puck comprises a shell having a plurality of ribs. The ribs help absorb and disperse impact forces to protect the motorcycle from damage.

These and other aspects of the present invention, together with the organization and operation thereof, will become apparent from the following detailed description of the invention when taken in conjunction with the accompanying drawings.

BRIEF DESCRIPTION OF THE DRAWINGS

FIG. 3 is a left side partial perspective view of the motorcycle illustrated in FIG. 1.

FIG. 4 is a left side view of the protective device shown in FIG. 3.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

DESCRIPTION OF THE ILLUSTRATED EMBODIMENTS

Figure 2:
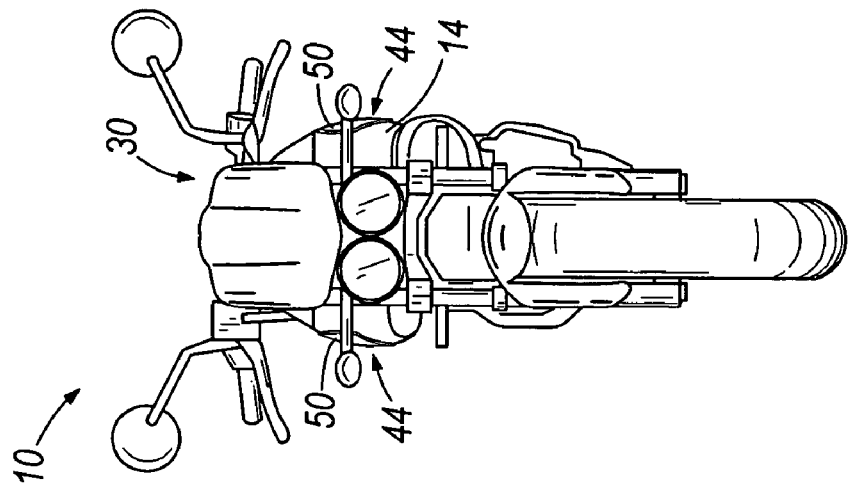
FIG. 2 is a front view of the motorcycle illustrated in FIG. 1.
Figure 1:
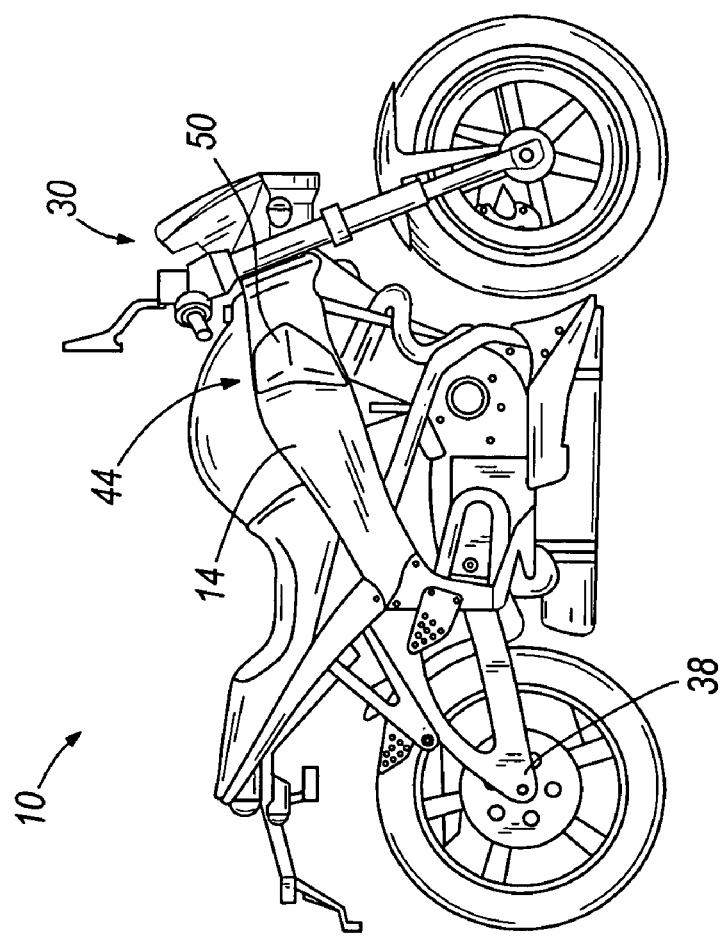
FIG. 1 is a right side view of a motorcycle having a protective device according to one embodiment of the present invention.

FIG. 1 illustrates a motorcycle 10 that includes a frame 14, a steering assembly 30 mounted to the front of the frame 14, and a swingarm 38 pivotally interconnected to the rear of the frame 14. As illustrated in FIG. 2, certain portions 44 of the frame 14 extend further out from the centerline of the motorcycle 10 than most other major components positioned within the frame 14. As such, if the motorcycle 10 were to tip-over, this portion of the motorcycle 10 would likely hit the ground and sustain damage. Unfortunately, damage to the frame 14 of the illustrated motorcycle 10 is difficult to fix and may result in the frame 14 being replaced. Accordingly, as shown in FIGS. 1–3, protective devices 50 are positioned over these protruding areas 44 to prevent the motorcycle 10 from sustaining damage.

FIGS. 4–7 illustrate a left side protective device 50, and FIG. 1 illustrates a corresponding right side protective device 50. Because the right and left protective devices 50 are identical mirror images of each other, common reference numbers are used to describe both sides.

Figure 5:
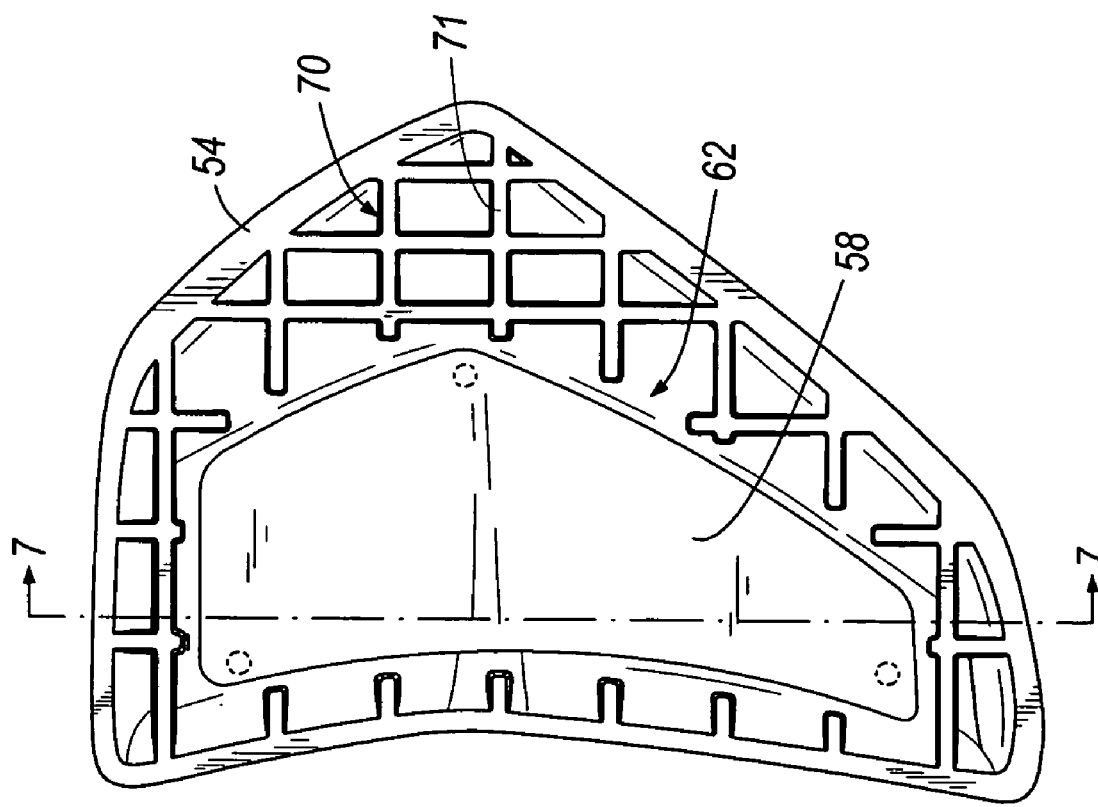
FIG. 5 is a right side view of the protective device of FIG. 4.

As best shown in FIGS. 4 and 5, the protective device 50 includes a shell 54 and a cushion 58 positioned within a recess 62 of the shell 54. The shell 54 and cushion 58 work together to disperse the impact force from the point of impact over a larger area and to absorb the impact force to prevent damage to the frame 14 at the point of impact.

The shell 54 is made from a semi-rigid material, such as thermoplastic elastomers sold under the name TREXPRENE by Comtrex of Warren, Mich. However, in other embodiments, the shell 54 can be made from other materials, such as other plastics, rubber, metals, and the like. The semi-rigid shell material is rigid enough to provide adequate protection and resist substantial wear during a sliding incident, but is also flexible to deform without shattering during an impact with the ground. Preferably, the shell 54 deforms elastically during impact. The ability to deform prevents the entire impact force from translating through the protective device 50 to the frame 14.

Figure 7:
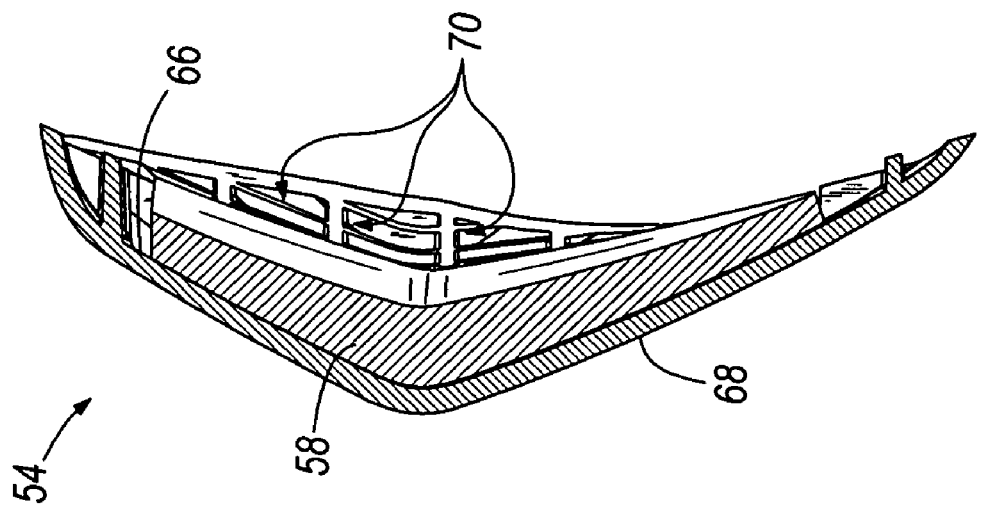
FIG. 7 is a cross-sectional view taken along line 7—7 of FIG. 5.
Figure 6:
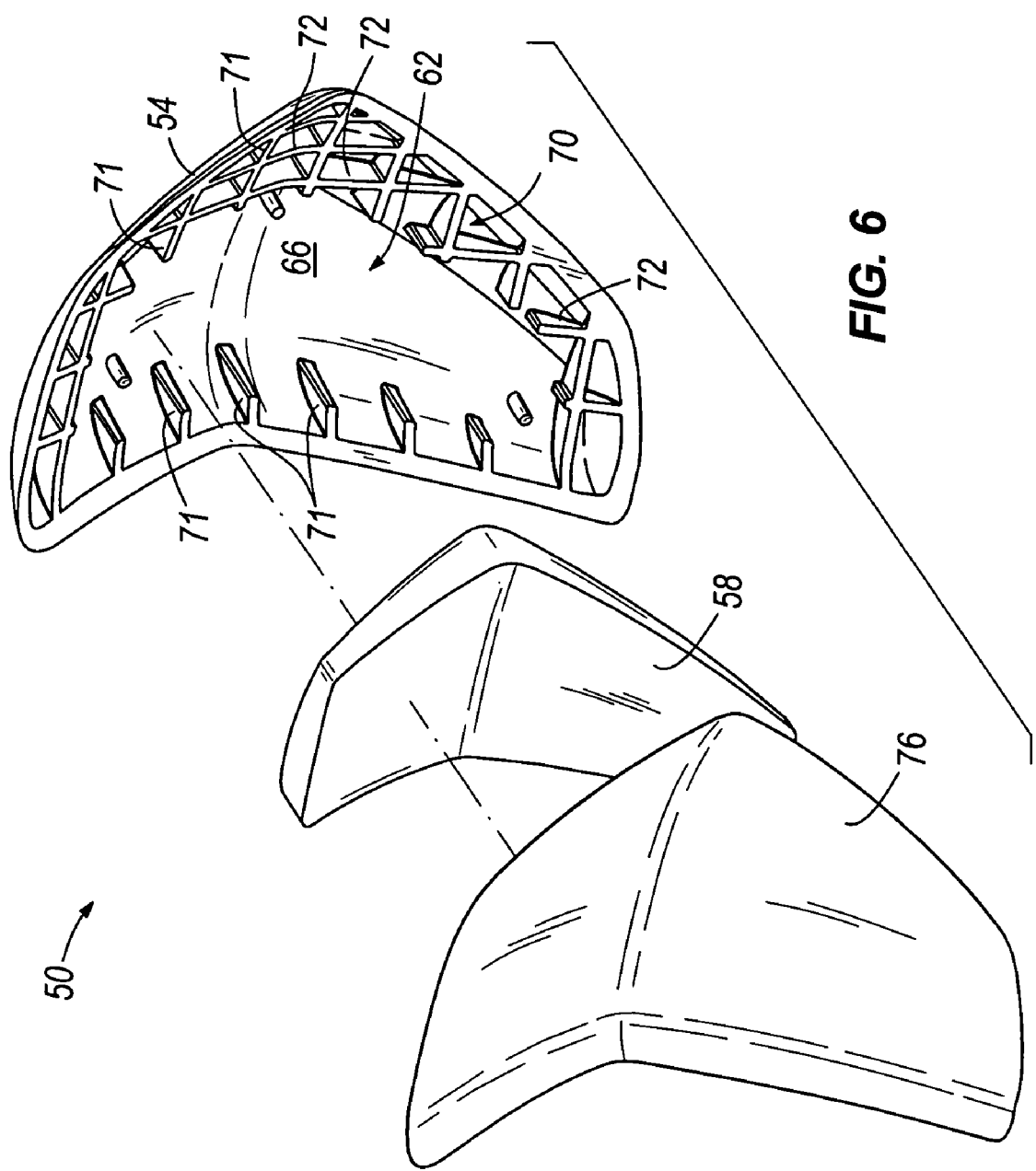
FIG. 6 is an exploded view of the protective device of FIG. 4.

As shown in FIGS. 6 and 7, the shell 54 has an inner surface 66 that faces toward the motorcycle 10 and an outer surface 68 that faces away from the motorcycle when the protective device is coupled to the motorcycle 10. A plurality of ribs 70 extend across at least a portion of the inner surface 66 of the shell 54. The ribs 70 are integrally formed with the shell 54 and provide support to the outer surface 68 of the shell 54. A first set of ribs 71 extend across the inner surface 66 in a first direction and a second set of ribs 72 extend across the inner surface 66 in a second direction different than the first direction. Specifically, the first set of ribs 71 is substantially perpendicular to the second set of ribs 72 in the illustrated embodiment. In other embodiments, the sets of ribs can intersect at different angles and additional sets of ribs can be provided.

The ribs 70 extend inward from the periphery of the shell 54 to at least partially define the recess 62. The height of each rib 70 varies as it extends from the periphery of the shell 54 toward the recess 62. Generally, the height of each rib 70 is greater near the recess 62 than near the periphery of the shell 54. This added height increases the thickness of the protective device 50 at the probable point of impact, which consequently provides greater resistance to damage at the point of impact. Specifically, the greater thickness allows for more force absorbing material to be positioned between the frame 14 and the ground. By having more material at the point of impact, it is less likely that sufficient force will pass through the protective device 50 to the frame 14 to cause damage. The added height also provides for a deeper recess, which allows more cushion material (if used) to be stored within recess.

The outer periphery of shell 54 and a surface of each rib 70 define a surface that is positioned adjacent the motorcycle's frame 14 once the protective device 50 is installed. The greater surface contact area provided by the ribs 70 helps prevent the protective device 50 from shearing off of the motorcycle 10 during a sliding incident. Specifically, the greater contact area allows more adhesive to connect the protective device to the frame 14.

The protective device 50 is coupled to the motorcycle 10 with an adhesive 76 that has high shear strength to prevent removal of the protective device 50 from the motorcycle 10 in a sliding incident. By using adhesive, the protective device 50 can be removed without leaving damage to the frame 14 or other portions of the motorcycle 10 such as a fairing.

The absence of the ribs 70 in the area of the recess 62 is advantageous in some embodiments. For example, in the illustrated embodiment, the absence of ribs 70 in the area of the recess 62 helps prevent the impact force from directly transferring through the protective device 50 without cushioning. It is assumed that the impact occurs on the shell 54 near the position corresponding to the greatest depth of the recess 62. Upon impact, the shell 54 compresses in the area of the recess 62 and some of the impact force is transferred sideways by the shell 54 to the ribs 70 positioned outside the point of impact. The transfer of force to the ribs 70 located outside the point of impact increases area in which force is received by the frame 14, and the movement of the shell 54 and the ribs 70 cause some of the impact force to dissipate as well.

The cushion 58, which is located within the recess 62, also helps to absorb the impact energy. Specifically, the cushion 58 is made from foam, and more specifically, it is made from Expanded Polystyrene (EPS) foam. In some embodiments, the foam has a density of about 1.5 pounds per cubic inch. During an impact, the foam compresses to absorb the impact energy. Although the cushion 58 can have substantially any shape, it preferably has its greatest thickness located at the probable point of impact and the thickness gradually tapers away from that point. This shape generally corresponds with the shape of the recess 62.

The protective device 50 of the illustrated embodiment is constructed as follows. The shell 54 and the cushion are each formed using injection molding or other suitable manufacturing processes. The cushion is then attached to the shell 54 with an adhesive, such as RTV silicon. However, in other embodiments, the cushion 58 can be attached in other manners. A sheet 76 having double-sided adhesive with high shear strength, such as an acrylic adhesive, is then applied to the cushion 58 and the shell 54 on the surfaces that engage the motorcycle 10. Acrylic adhesive tape is used in some embodiments.

Once the protective device 50 is assembled, the protective device 50 can then be positioned on and coupled to the motorcycle frame 14 at the probable point of impact. The area of the protective device 50 having the greatest thickness is positioned over the probable point of impact. Additionally, several edges of the protective device 50 are positioned adjacent to an edge of the frame 14. Specifically, the top, bottom, and rear edges of the protective device are positioned adjacent an edge of the frame. By positioning as many edges of the protective device adjacent an edge of the cavity, additional protection against denting is afforded to the frame 14. Generally, the frame 14 has greater strength near the edges. According, it is less likely that the protective device 50 will transfer sufficient force to the frame 14 to cause a dent adjacent an edge.

As shown in FIG. 3, the protective device 50 can be configured to have certain features that align with landmarks or contours of the motorcycle frame 14 to assist with properly positioning the protective device 50. For example, in the illustrated embodiment, a rear edge 80 of the protective device 50 is shaped similar to a knee cavity portion of the frame 14. To properly install the protective device 50, the rear edge 80 of the protective device will abut or be positioned adjacent to the similarly shaped feature on the frame 14. Additionally, a point 82 is positioned along the front edge 86 of the protective device 50. This point 82 is positioned along a crest 88 on the frame 14 when the protective device 50 is properly positioned. Finally, the top and bottom edges of the protective device 50 are positioned adjacent to and shaped similarly to a top and bottom edge of the frame 14, respectively.

Although the landmarks illustrated in FIG. 3 are particular to the illustrated motorcycle 10, the protective device 50 can be shaped differently in other embodiments to provide alignment features with distinctive landmarks on other motorcycles. Furthermore, the landmarks do not have to be located on the frame 14. In some embodiments, the probable point of impact subject to the greatest damage may be in a location other than the frame 14. For example, the swing arm 38, steering assembly 30, or fairing (not shown) may be subjected to potentially damaging forces during a tip-over or sliding incident. Accordingly, the protective device can be properly configured and shaped to protect these or other areas as well.

In operation, the protective device 50 protects the motorcycle 10 in two ways. First, it protects the motorcycle 10 from damage due to the forces applied to the motorcycle 14 at the point of impact in a tip-over incident (stationary or moving). Second, assuming the tip-over incident occurs while moving, the protective device 50 protects the point of impact from sliding forces. In a tip-over incident, the shell 54 protects against scratching, disperses the impact force over a greater area of the frame 14, and absorbs some of the impact force. The cushion 58 also absorbs the impact force, which reduces the magnitude of the force being applied to the frame 14. In a sliding incident, the protective device 50 performs the functions as indicated above for the initial tip-over event, and during the slide, the shell 54 also protects the frame 14 from abrasion.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, the cushion 58 of the protective device 50 is not necessary in all embodiments. Particularly, some embodiments of the protective device 50 can have a shell 54 with an increased number of ribs. In such an embodiment, the material of the shell 54 and/or the thickness, density, and position of the ribs can be adjusted to achieve a proper balance between rigidity and flexibility. Yet other embodiments may omit the ribs altogether.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

Various features of the invention are set forth in the following claims.

We claim:

1. A protective device for protecting a motorcycle having a point of impact with the ground during a tip-over incident, the protective device comprising:
    a shell having a recess;
    a cushion positioned within the recess of the shell; and
    adhesive coupled to at least one of the shell and the cushion and positioned to contact the motorcycle near the point of impact;
    wherein the shell and the cushion deform to absorb energy and protect the point of impact of a motorcycle during a tip-over incident.

2. The protective device of claim 1, wherein the adhesive is a high shear strength adhesive coupled to the shell.

3. The protective device of claim 1, wherein the cushion is coupled to the shell with an adhesive.

4. The protective device of claim 1, wherein the cushion is foam.

5. The protective device of claim 4, wherein the foam has a density of about 1.5 pounds per cubic inch.

6. The protective device of claim 1, wherein the shell is made from a semi-rigid plastic.

7. The protective device of claim 6, wherein the shell is made from a thermoplastic elastomer.

8. The protective device of claim 1, wherein the shell has an outer surface and an inner surface, the inner surface having a plurality of ribs extending across at least a portion of the inner surface and defining the recess.

9. The protective device of claim 8, wherein the plurality of ribs comprise a first set of ribs extending in a first direction and a second set of ribs extending in a second direction that is different than the first direction.

10. The protective device of claim 9, wherein the first and second directions are substantially perpendicular to each other.

11. The protective device of claim 1, wherein the shell has an outer surface and an inner surface, the inner surface having a plurality of ribs extending from an outer periphery of the shell toward the recess, the ribs have a height extending away from the inner surface, the height of each rib being the greatest adjacent the recess.

12. A motorcycle comprising:
    an area subjected to impact forces with the ground due to a tip-over incident;
    a protective device coupled to the area, the protective device comprising:
    a shell having a recess; and
    a cushion positioned within the recess of the shell, wherein the cushion is foam;
    wherein the shell and the cushion deform to absorb energy and protect the area during a tip-over incident, and wherein the area subjected to impact forces is a side of a gas tank.

13. The motorcycle of claim 12, wherein the protective device further comprises a high shear strength adhesive coupled to the shell and positioned to contact the motorcycle near the point of impact.

14. The motorcycle of claim 12, wherein the cushion is coupled to the shell with an adhesive.

15. The motorcycle of claim 12, wherein the foam has a density of about 1.5 pounds per cubic inch.

16. The motorcycle of claim 12, wherein the shell is made from a semi-rigid plastic.

17. The motorcycle of claim 12, wherein the shell is made from a thermoplastic elastomer.

18. The motorcycle of claim 12, wherein the shell has an outer surface and an inner surface, the inner surface having a plurality of ribs extending across at least a portion of the inner surface and defining the recess.

19. The motorcycle of claim 18, wherein the plurality of ribs comprise a first set of ribs extending in first direction and a second set of ribs extending in a second direction that is different than the first direction.

20. The motorcycle of claim 19, wherein the first and second directions are substantially perpendicular to each other.

21. The motorcycle of claim 12, wherein the shell has an outer surface and an inner surface, the inner surface having a plurality of ribs extending from an outer periphery of the shell toward the recess, the ribs have a height extending away from the inner surface, the height of each rib being the greatest adjacent the recess.

22. A protective device for protecting a motorcycle having a point of impact with the ground during a tip-over incident, the protective device comprising:
    a semi-rigid shell having an outer surface and an inner surface, the inner surface having a plurality of ribs extending across at least a portion of the inner surface;
    a high shear strength adhesive coupled to the shell and positioned to contact near the point of impact;
    wherein the shell and the ribs deform to absorb energy and protect the point of impact of a motorcycle during a tip-over incident.

23. The protective device of claim 22, wherein several of the ribs are positioned to at least partially define a recess.

24. The protective device of claim 23, wherein the ribs have a height extending away from the inner surface, the height of each rib being the greatest adjacent the recess.

25. The protective device of claim 23, further comprising a foam cushion positioned within the recess of the shell.

26. The protective device of claim 25, wherein the foam cushion is coupled to the shell with an adhesive.

27. The protective device of claim 25, wherein the foam has a density of about 1.5 pounds per cubic inch.

28. The protective device of claim 24, wherein the shell is made from a thermoplastic elastomer.

29. The protective device of claim 22, wherein the plurality of ribs comprise a first set of ribs extending in first direction and a second set of ribs extending in a second direction that is different than the first direction.

30. The protective device of claim 29, wherein the first and second directions are substantially perpendicular to each other.

31. A protective device for protecting a motorcycle having a point of impact with the ground during a tip-over incident, the protective device comprising:

a shell having a recess;

a cushion positioned within the recess; and adhesive coupled to the shell and configured to adhere the shell to a frame of the motorcycle such that the shell encloses the cushion;

wherein the shell and the cushion deform to absorb energy and protect the point of impact of a motorcycle during a tip-over incident.

* * * * *

UNITED STATES PATENT AND TRADEMARK OFFICE
CERTIFICATE OF CORRECTION

PATENT NO.        : 7,144,030 B2
APPLICATION NO. : 10/886134
DATED              : December 5, 2006
INVENTOR(S)       : Erik F. Buell et al.

Page 1 of 1

It is certified that error appears in the above-identified patent and that said Letters Patent is hereby corrected as shown below:

On Title Page

Item (75) Inventors:

delete: "Brain R. Sucharski"

insert: -- Brian R. Sucharski--

Signed and Sealed this

Thirty-first Day of July, 2007

JON W. DUDAS
*Director of the United States Patent and Trademark Office*